Figure 1:
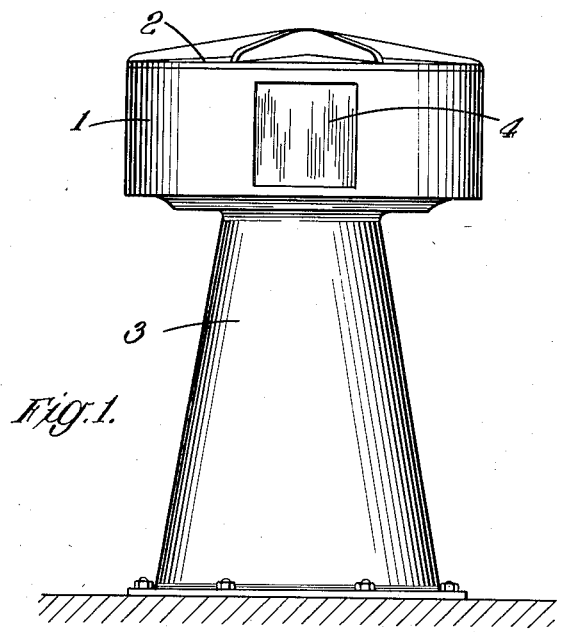

April 20, 1937.  B. E. LUBOSHEZ  2,077,704
X-RAY PHOTOGRAPHIC APPARATUS
Filed Nov. 22, 1934   4 Sheets-Sheet 1

INVENTOR_
B. E. LUBOSHEZ
BY
Louis H. Cameron
ATTORNEY.

April 20, 1937.  B. E. LUBOSHEZ  2,077,704
X-RAY PHOTOGRAPHIC APPARATUS
Filed Nov. 22, 1934  4 Sheets—Sheet 2
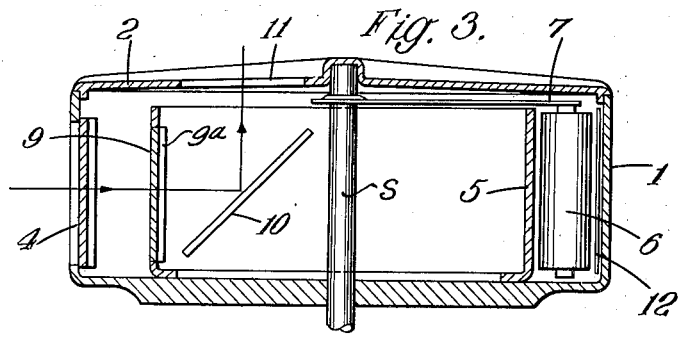
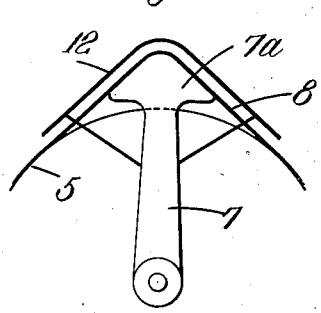 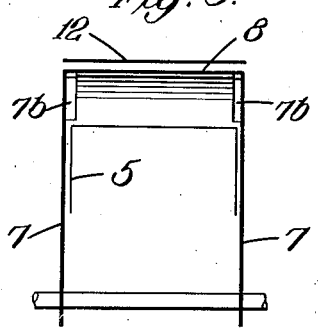
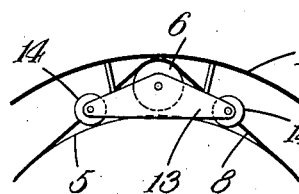 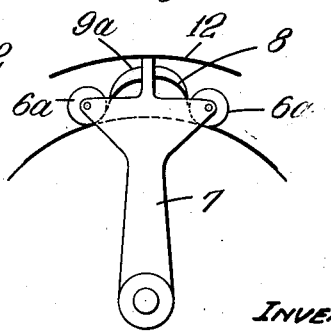
INVENTOR.
B. E. LUBOSHEZ
BY
Louis H. Cameau
ATTORNEY

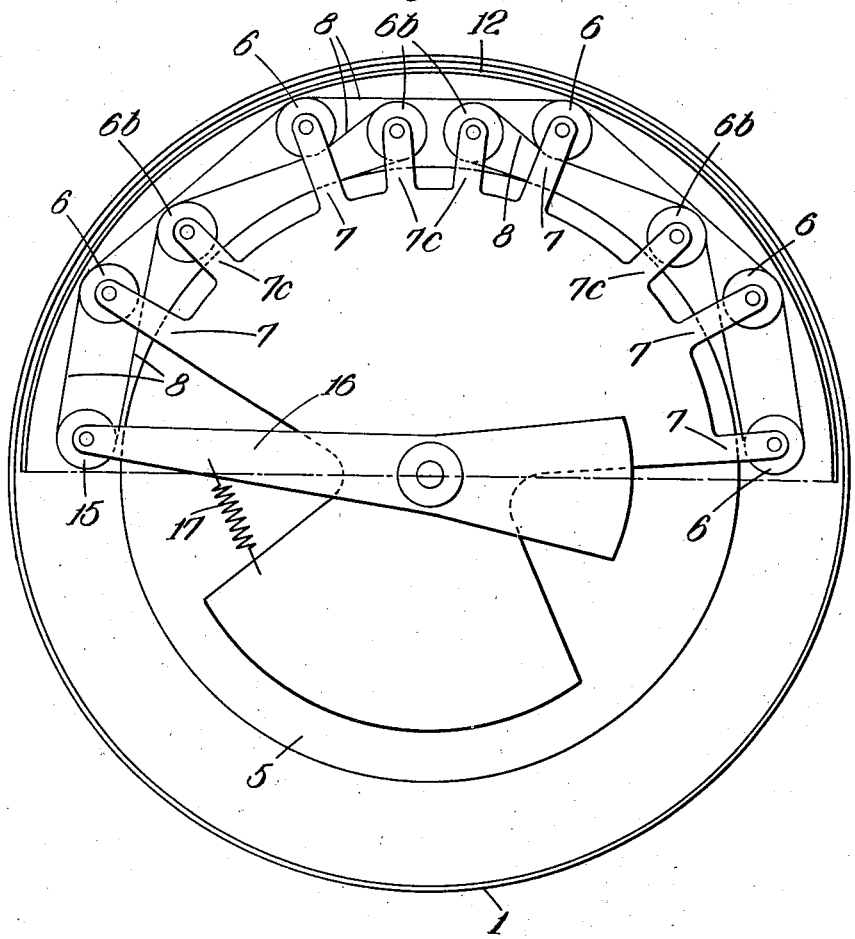

Patented Apr. 20, 1937

2,077,704

UNITED STATES PATENT OFFICE 2,077,704

X-RAY PHOTOGRAPHIC APPARATUS

Benjamin Ellan Luboshez, Harrow, England

Application November 22, 1934, Serial No. 754,328
In Great Britain November 22, 1933

11 Claims. (Cl. 250—34)

The present invention relates to apparatus for taking X-ray or like radiation photographs life-size in the usual manner by means of shadows of the object to be photographed cast on the emulsion by the X-rays, and the main object is to obtain a series of radiographs in rapid succession upon the photographic film or paper showing different phases of the motion of the part being radiographed. Such series would not consist of a very large number of separate exposures and are for individual examination and not to be confused with kinematograph arrangements. The series obtained are used to analyze the movements of rapidly moving parts of the human body, but the apparatus according to the invention is equally applicable for giving radiographs at larger time intervals when desired, for example, intervals varying between fractions of a second and hours.

Owing to the usual methods of changing one piece of sensitive emulsion for another for making a second exposure by the shadow method, a series of pictures with existing apparatus has only been practicable when the permissible intervals between exposures have not been less than a few seconds, but where the intervals between exposures must be less than a second, as for example in the case of an examination of the heart and the stomach, since no apparatus for radiography in this manner has been available, small scale kinematography is the only process which could have been used.

In the existing methods, it is usual to intensify the effect on the sensitive emulsion by placing this in its light-tight holder in contact with an X-ray fluorescent screen so that the emulsion is affected by the light emitted from the latter in addition to the effect of the rays themselves. A screen may be placed in this manner on one or both sides of the film and the latter may also be coated with a sensitive emulsion on both sides. In the present invention, however, except in the particular instance hereinafter mentioned, the X-ray screen is preferably employed on only one side of the film, but a film coated on either one or both sides may be employed.

The main object of the present apparatus is to enable a sensitive emulsion which is held in contact with the X-ray screen inside the light-tight container to be rapidly removed from the screen and another piece of film put in its place, and to this end the invention consists broadly in employing a band of film surrounding a drum, a part of the film lying in contact with the X-ray screen at a certain part of the circumference of the drum, whilst the special device employed in accordance with the invention enables that part of the band in contact with the screen to be lifted and moved aside whilst another part of the band which may or may not be adjacent to the part so lifted is laid down in its place without any relative movement between the band and the screen which would cause frictional markings on the surface of the film.

The principle on which one modification of the invention is based can best be understood by visualizing a belt around driving and driven pulleys, the driving pulley being very much larger than the driven pulley and the distance between centres short so that the pulleys are almost in contact. In such an arrangement, the belt would be very little longer than the circumference of the driving pulley. If now any point in the circumference of the driving pulley in contact with a point on the belt is considered and the driving pulley is given one complete revolution, it will be seen that at the end of the revolution the said point on the circumference will be in contact with another point on the belt at a distance from the first point equal to the difference between the length of the belt and the length of the circumference of the driving pulley. In the employment of this principle in accordance with the invention a member equivalent to the driving pulley is held stationary whilst the driven pulley, mounted on an arm rotatable about the axis of the driving pulley, is rotated around the latter. It will be seen that the effect on the belt is precisely the same. Equivalent parts to the above described arrangement in an apparatus embodying the invention comprise a large diameter open-ended hollow drum equivalent to the driving pulley, a band of film equivalent to the belt, and a roller carried by an operating arm equivalent to the driven pulley. This roller may for convenience be termed the operating or film-changing roller.

Figure 2:
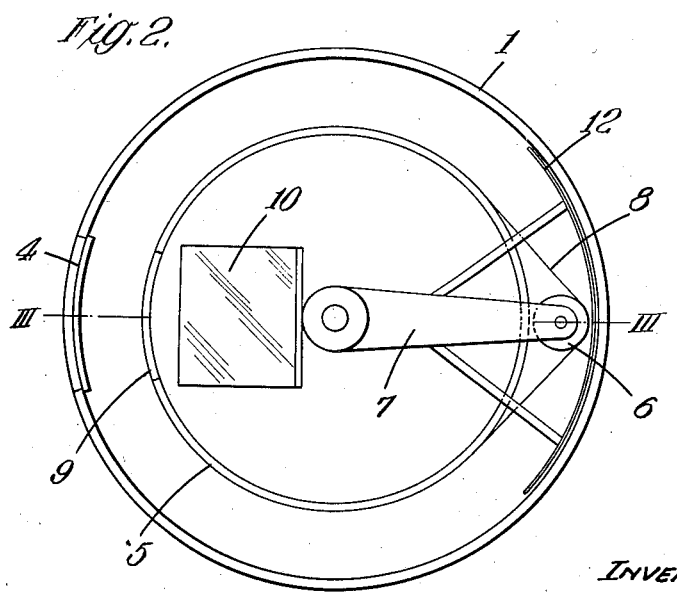
Figure 8:
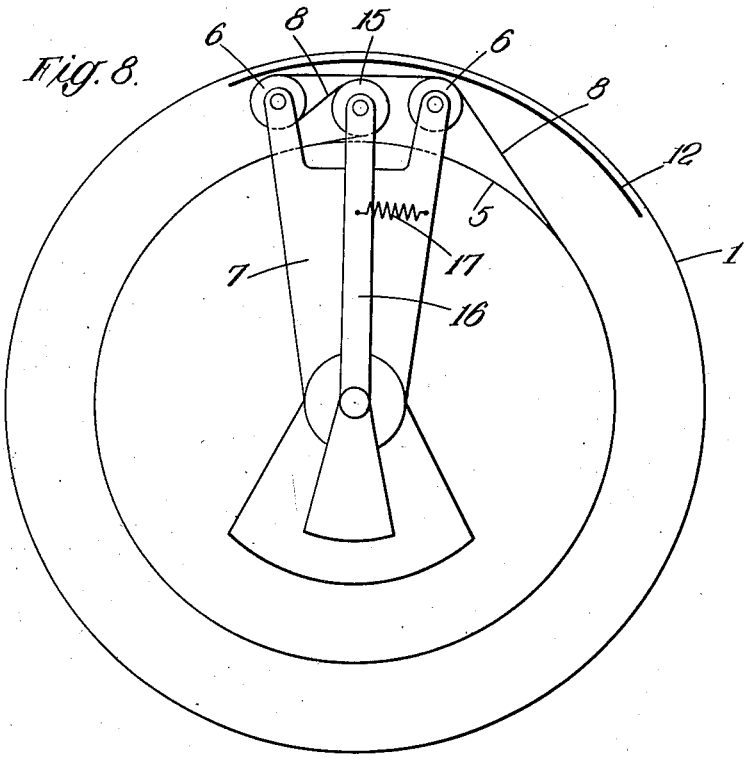
Figure 10:
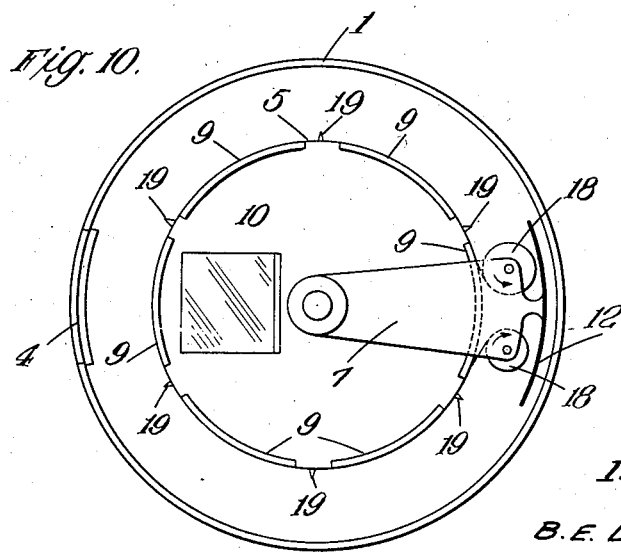

In the accompanying drawings, Fig. 1 represents an exterior view of apparatus according to the invention as seen from the direction in which the X-rays enter. Fig. 2 is a plan to a larger scale with the lid off, and Fig. 3 is a cross section of the camera and part of support, on the line III—III of Fig. 2. Figs. 2 and 3 represent the simplest form as above described, of which Figs. 4-7 are detail modifications. Figs. 8 and 9 are diagrammatic representations in plan of further modifications, and Fig. 10 is a similar view of apparatus working on a slightly modified principle.

In Fig. 1, the "camera" consists of a cylindrical casing 1 closed by a removable cover 2, and mounted for convenience on a supporting pillar 3, which may be conical and of sheet metal. The casing is provided with a "window" 4 through which the X-rays are admitted, this being closed by a light-tight material through which X-rays penetrate easily, for example, thin aluminum. The remainder of the casing, or at least so much of it around the window 4 as is exposed to the rays, must be impervious to X-rays as for example by being lead-lined. In practice, the part of the patient to be radiographed is placed between the X-ray tube and the window 4, pressed close up against the latter, and the usual shadowgraph formed inside the casing, where the invention lies in the film-changing arrangements.

In Figs. 2 and 3, the above-mentioned drum made of a material opaque to X-rays is shown at 5, within and substantially concentric with the casing 1, the film-changing roller at 6 carried by a rotatable arm 7 pivoted concentrically with the drum, and the film 8 tautly surrounding both drum and roller as an endless band, with the sensitive emulsion inwards if it is coated on one side only.

The arm 7 is carried by a shaft S which may be rotated by suitable means (not shown) connected to the lower end of said shaft.

On that part of the cylindrical surface of the drum facing the window 4, the fluorescent screen 9 is located, and is preferably let in flush so as to leave a continuous smooth surface. It is clear how a radiograph can be produced on that part of the film band adjacent the screen 9. To view this picture by the light of the fluorescence, either before or during exposure, a fluorescent screen must be visible inside the drum, and a mirror 10 is located there at 45°, the image being viewed through an opening 11 in the cover 2. To enable a screen to be visible inside, either an additional screen 9a could be located on the inner surface of the drum, that part of the drum where screen 9 is located then being of a material transparent to X-rays, or the screen 9 can be mounted in an aperture in the drum and made of a material sufficiently rigid to maintain its arcuate form, or said aperture may be closed by an arcuate glass support for the screen 9.

When fastening a band of film in position, the joint can be arranged over the screen 9, when the fogging of this part during preparatory viewing will not matter.

From the above explanation, it will be clear how rotation of the arm 7 past the window 4 will lift off the screen 9 that part of the film lying on it and place thereon an adjacent part, without any slip between film and screen or drum. To avoid blurring of the image on the film during this movement, a shutter 12, opaque to X-rays, e. g. made of lead, is carried by the arm 7 to close the window 4. This shutter extends circumferentially a sufficient distance to cover as much film as is looped off the drum by the roller 6.

In the modification shown in the fragmentary view Fig. 4, a smooth edged extension 7a of the arm 7 is used instead of the roller 6, preferably formed by turning over the edges of a sheet-metal arm as shown in Fig. 5 at 7b. To avoid scratching the film, this extension only supports the edge of the film; it is therefore necessary to use an arm 7 on both sides of the drum, as shown in the cross section Fig. 5. Fig. 4 also shows the shutter 12 as conforming to the shape of the film loop, avoiding the gaps between the ends of the shutter and the film, so giving a sharper cut-off.

In the modification shown in the fragmentary view Fig. 6, the film-changing roller 6 is carried by a carriage 13 running on grooved guide rollers 14 around the periphery of the drum.

Fig. 7 shows a method of shortening the film loop and thus the shutter 12, thereby allowing a decreased interval between exposures. From what has been said above, it will be seen that the action of the film on the drum is identical with the progression of a caterpillar, so that the loop may be formed and advanced in precisely the same manner by means of a roller 6a on either side of it holding it in contact with the drum. These rollers are carried by the arm 7 and there is then no need for the roller 6 to keep the film taut. Now as previously mentioned, a fluorescent screen on both sides of the film is desirable. It can be employed in this apparatus by having a fluorescent band surrounding the film, but the difficulty would be to obtain both of the same length or to keep both taut if the lengths differed. This difficulty is removed by the changing means shown in Fig. 7, for since the slack is confined to the loop between rollers 6a without the necessity for devices for taking it up, the surrounding fluorescent band 9a can be definitely longer than the film without effect.

Fig. 8 shows a means of accommodating a longer loop of film without increasing the gap between the drum and casing Conversely, for the same size of picture this gap can be reduced, thereby increasing the sharpness of the shadow image Two rollers 6 are carried by the arm 7, and the extra length of film loop is taken up between them by means of a roller 15 carried on an auxiliary arm 16, pivoted independently of the arm 7 and biassed relatively thereto by a spring 17 so as to keep the loop taut.

Fig. 9 shows an arrangement for employing a very much longer band of film, or conversely for the same number of pictures the diameter of the drum can be considerably reduced. Five rollers 6 are mounted on arms 7 carried by a plate pivoted concentrically with the drum, and four intermediate rollers 6b are mounted on arms 7c carried by the said plate. The film is placed around these rollers in the manner shown, and the slack taken up by the roller 15 mounted on the spring-biassed auxiliary arm 16 as in Fig. 8. This arrangement necessitates a shutter extending about half way round the drum, but it will be observed that exposure times need not be reduced thereby. The length of film should be twice the circumference of the drum plus or minus one picture width.

Where very many more exposures are required on one film than can be arranged for in the above described forms of the apparatus without an inconveniently large drum, the modification shown in Fig. 10 is adopted. In this, a plurality of fluorescent screens 9 are located all around the drum, and instead of the roller 6, the arm 7 carries two film spools 18 spring biased rotationally in the direction of the arrows so as to maintain a length of film band taut around the drum. Any length of film may be wound on the spools within the limits of the space between drum and case. It will now be seen that as the arm 7 is rotated, film is unwound from the trailing spool and laid on the drum, so winding up the spring in that spool, whilst the wound spring in the other spool takes up the film on the leading side. By repeated rotation of the arm in one direction, exposures will be made along the length of the film, spaced at distances equal to the circumference of the drum, until all the film has been wound on to one spool. When this has been done, the drum will be partially rotated by any suitable means (not shown), so as to bring the next screen 9 opposite the window 4, and the arm 7 will be rotated repeatedly in the opposite direction, thus producing a second series of spaced exposures, each located beside one of the first. These operations will be repeated until all the film is filled. There need be no difficulty due to this intermixing of the series if proper viewing arrangements are employed, or the film is appropriately marked and numbered with the series and subsequently cut up. In one method of keeping the different series of pictures distinct, each screen bears a number in a corner and this number appears on the finished radiographs. Also, in order to be able to process the pictures individually when desired, means are provided for marking the dividing line between successive pictures. This marking can either be done at the film factory by some mark easily recognizable in the dark-room, such as perforated holes, or the taking apparatus itself can do the marking. The simplest system is to provide tiny sharp pins 19 sticking out of the drum midway between the screens which would mark the photographic material with a small hole or embossing which could be felt afterwards in the dark room.

To enable the finished pictures to be arranged in exact register when the rolls of film are cut up and it is desired to copy them for projecting cinematographically afterwards, centre lines are marked on each of the screens which become reproduced in the pictures, or lead cross-wires may be used at the window in the outer casing. If the opaque window is removed and the finished roll of pictures put in place in exactly the same order as when taking, the apparatus can be used as a direct vision kinematograph where a paper band has been employed. Where, however, a film has been used so that the results are transparencies, arrangements in the form of a lamp and reflector inside the drum must be provided and the fluorescent screens omitted.

I claim:—

1. Apparatus for taking a plurality of X-ray substantially life-size shadowgraphs comprising a casing, a "window" therein transparent to X-rays, a cylindrical drum within the casing, a rotatable arm radial to the drum pivoted concentrically therewith, and means carried by said arm for maintaining a band of film taut around the drum and for lifting off the drum where it faces said window a part of said band and laying thereon another part as the arm is rotated around the drum.

2. Apparatus for taking a plurality of X-ray substantially life-size shadowgraphs comprising a casing, a "window" therein transparent to X-rays, a cylindrical drum within the casing, a fluorescent screen on the surface of the drum facing said window, a rotatable arm radial to the drum pivoted concentrically therewith, and means carried by said arm for maintaining a band of film taut around the drum and for lifting a part of the band off said screen and laying thereon another part as the arm is rotated around the drum.

3. Apparatus for taking a plurality of X-ray substantially life-siz shadowgraphs comprising a casing, a "window" therein transparent to X-rays, a cylindrical drum within the casing, a fluorescent screen on the surface of the drum facing said window, a rotatable arm radial to the drum pivoted concentrically therewith, and roller means carried by said arm for accommodating the slack in a length of film passed around the drum and for lifting a part of the film off said screen and laying thereon another part as the arm is rotated around the drum.

4. Apparatus for taking a plurality of X-ray substantially life-size shadowgraphs comprising a casing, a "window" therein transparent to X-rays, a cylindrical drum within the casing, a fluorescent screen on the surface of the drum facing said window, a rotatable arm radial to the drum pivoted concentrically therewith, and spring biassed roller means carried by said arm for accommodating the slack in a length of film passed around the drum and for lifting a part of the film off said screen and laying thereon another part as the arm is rotated around the drum.

5. Apparatus for taking a plurality of X-ray substantially life-size shadowgraphs comprising a casing, a "window" therein transparent to X-rays, a cylindrical drum within the casing, a fluorescent screen on the surface of the drum facing said window, a rotatable arm radial to the drum pivoted concentrically therewith, and a roller carried by said arm for distending into a loop the slack of an endless band of film of greater length than the circumference of the drum and placed around the drum.

6. Apparatus for taking a plurality of X-ray substantially life-size shadowgraphs comprising a casing, a "window" therein transparent to X-rays, a cylindrical drum within the casing, a plurality of fluorescent screens on the surface of the drum, means for bringing any one of said screens facing said window, a rotatable arm radial to the drum pivoted concentrically therewith, a long band of film around the drum, and two spools carried by said arm rotationally spring biassed to wind the ends of said film thereon in a direction to maintain it taut around the drum.

7. Apparatus for taking a plurality of X-ray substantially life-size shadowgraphs comprising a casing, a "window" therein transparent to X-rays, a cylindrical drum within the casing, a fluorescent screen on the outer surface of the drum facing said window, a coincident fluorescent screen on the inner surface of the drum accessible to X-rays reaching the first screen from without, a rotatable arm radial to the drum pivoted concentrically therewith, reflecting means within the drum to enable the inner screen to be viewed from a direction substantially axial to the drum, and means carried by said arm for maintaining a band of film taut around the drum and for lifting a part of the band off said screen and laying thereon another part as the arm is rotated around the drum.

8. Apparatus for taking a plurality of X-ray substantially life-size shadowgraphs comprising a casing, a "window" therein transparent to X-rays, a cylindrical drum within the casing, a fluorescent screen forming a part of the circumference of the drum facing said window and visible from within the drum, a rotatable arm radial to the drum pivoted concentrically therewith, reflecting means within the drum to enable said screen to be viewed from a direction substantially axial to the drum, and means carried by said arm for maintaining a band of film taut around the drum and for lifting a part of the band off said screen and laying thereon another part as the arm is rotated around the drum.

9. Apparatus for taking a plurality of X-ray substantially life-size shadowgraphs comprising a casing, a "window" therein transparent to X-rays, a cylindrical drum within the casing, a fluorescent screen on the surface of the drum facing said window, a rotatable arm radial to the drum pivoted concentrically therewith, means carried by said arm for maintaining a band of film taut around the drum and for lifting a part of the band off said screen and laying thereon another part as the arm is rotated around the drum, and a shutter opaque to X-rays carried by said arm and extending circumferentially as far as to cover as much of the film as is looped off the drum by said lifting means.

10. Apparatus for taking a plurality of X-ray substantially life-size shadowgraphs comprising a casing, a "window" therein transparent to X-rays, a cylindrical drum within the casing, a fluorescent screen on the surface of the drum facing said window, a rotatable arm radial to the drum pivoted concentrically therewith, an endless band of film around the drum, an endless band of fluorescent screen around the drum outside said film, and means carried by said arm for maintaining both said bands taut around the drum and for lifting a part of the film off said first mentioned screen and laying thereon another part as the arm is rotated around the drum.

11. Photographic film-changing apparatus for removing a film from an exposure position and replacing it with another without sliding contact between the film and its support, comprising a cylindrical support for an endless band of film of greater length than the circumference thereof, means located between the film and its support for maintaining the film taut around the support, means for guiding and moving said tensioning means in a circular path concentric with the support, and means carried by said guiding means for lifting a part of the film band off the support and laying thereon another part as said tensioning means is moved around the support.

BENJAMIN ELLAN LUBOSHEZ.